United States Patent Office 3,267,149
Patented August 16, 1966

3,267,149
4-HYDROXYBUTYL PHOSPHORUS COMPOUNDS
Albert Y. Garner, Yellow Springs, Ohio, assignor to Monsanto Research Corporation, St. Louis, Mo., a corporation of Delaware
No Drawing. Filed July 13, 1962, Ser. No. 209,754
7 Claims. (Cl. 260—606.5)

This invention relates to organophosphorus compounds and more particularly provides hitherto unknown classes of phosphines and phosphine oxides, and the method of preparing the same.

According to the invention, there are provided dihydrocarbon-4-hydroxybutylphosphines or phosphine oxides or sulfides of the formula

where R is hydrocarbon which is free of olefinic and acetylenic unsaturation and contains from 1 to 12 carbon atoms, Y is a chalcogen element having an atomic weight of less than 33, and $n$ is zero or 1. I have found that compounds of the above formula are readily prepared by reaction of an appropriate dihydrocarbonphosphinous halide or dihydrocarbonphosphinic or phosphinothioic halide with tetrahydrofuran in the presence of an active metal as catalyst, reaction with a dihydrocarbonphosphinous halide to give dihydrocarbon-4-hydroxybutylphosphines occurring substantially as follows:

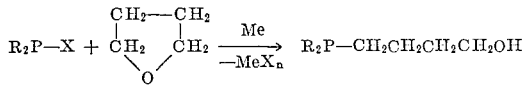

wherein R is as defined above, X is halogen, Me is a metal selected from the class consisting of alkali and alkaline earth metals, zinc, tin, aluminum and iron and $n$ is a number corresponding to the valence of said metal.

Reaction with the dihydrocarbonphosphinic halides takes place analogously to give dihydrocarbon-4-hydroxybutylphosphine oxides:

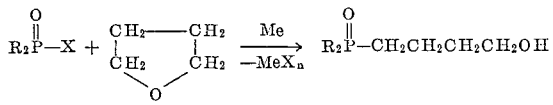

Reaction occurs similarly with the phosphinothioic halides to give dihydrocarbon-4-hydroxybutylphosphine sulfides.

The dihydrocarbon-4-hydroxybutylphosphine oxides or sulfides can also be prepared by reacting the corresponding phosphines with an oxidizing agent or with sulfur or a sulfur acyl halide, thus:

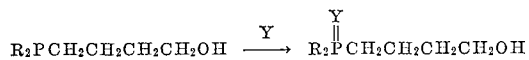

where Y is oxygen or sulfur.

The phosphinous or phosphinic halides which react with tetrahydrofuran to give the hydroxybutyl phosphines or phosphine oxides may be chlorides, bromides, fluorides or iodides and they may be aliphatic, aromatic, aliphatic-aromatic or cycloaliphatic and the two hydrocarbon radicals attached to the P may be the same or dissimilar. Examples of the useful phosphorus-containing reactants are:

Dimethylphosphinous chloride
Dibutylphosphinous bromide
Bis(2-ethylhexyl)hosphinous iodide
Didodecylphosphinous chloride
Ethylmethylphosphinous fluoride
Dipropylphosphinothioic chloride
Diethylphosphinic chloride
Dihexylphosphinic bromide
Dibenzylphosphinothioic chloride
Bis(2-phenylethyl)phosphinous chloride
Benzylmethylphosphinothioic chloride
Diphenylphosphinic bromide
Benzylphenylphosphinous iodide
Di-o-, m- or p-tolylphosphinous chloride
Di-α- or β-naphthylphosphinous bromide
Diphenylphosphinothioic iodide
β-Naphthylphenylphosphinic iodide
Di-p-xenylphosphinous bromide
Bis(m-ethylphenyl)phosphinous fluoride
Methylphenylphosphinothioic bromide
Dicyclohexylphosphinous bromide
Dicyclopentylphosphinothioic chloride
Cyclohexylphenylphosphinic iodide
Butylcyclopentylphosphinous chloride
Bis(2,4-dimethylcyclohexyl)phosphinic bromide
Dicyclopropylphosphinous chloride
Diacenaphthenylphosphinous chloride
Cyclopentyl-p-xenylphosphinic bromide The active metal may be a heavy metal such as zinc, tin, aluminum or iron or an alkali or alkaline earth metal, e.g., sodium potassium, lithium, rubidium, barium, calcium or magnesium. The alkaline earth metals are preferred, not only owing to their bivalency which permits use of lower quantities than that stoichiometrically required for the monovalent alkali metals, but also because of the comparative ease of reaction.

The reaction may be effected in the presence or absence of extraneous inert solvents or diluents, although conveniently an excess of tetrahydrofuran is used as diluent. Other materials which may be used for this this purpose include polar solvents such as dioxane, chloroform, acetonitrile, acetone, dimethyl sulfoxide, the dimethyl ether of diethylene glycol, etc.

Reaction of the phosphinous or phosphinic or phosphinothioic halides with the metal and tetrahydrofuran to form the hydroxybutyl phosphines or phosphine oxides or sulfides occurs readily at ordinary, decreased or increased temperature, e.g., at temperatures of from, say, 0° C. to the refluxing temperature of the reaction mixture, depending upon the nature of the individual reactants. Generally, with such active metals as magnesium, reaction is exothermic and, depending upon the reactivity of the phosphinous or phosphinic or phosphinothioic halide external cooling may be advantageously employed to moderate the initially vigorous reaction. In order to assure completion of the reaction, external heating may be subsequently applied. With the less reactive metals such as aluminum or iron, heating will generally be required for initiating the reaction. The reactivity of the phosphorus halide will vary with the nature of the halogen constituent thereof, i.e., with whether it is a chloride, iodide, fluoride or bromide, and with the molecular weight of the acyl halide, the higher molecular weight compounds such as the xenyl and the naphthyl compounds being more sluggish. Since ease and speed of reaction will depend upon the individual reactants it is recommended that for initial runs, the preparation first be attempted by slow introduction of reactants at ordinary or decreased temperature.

The phosphine or phosphine oxide or sulfide product will generally be soluble in the excess of tetrahydrofuran or in the extraneous polar solvent, when one is used. It can be separated from the reaction mixture by methods ordinarily employed in isolating procedures, e.g., fractional distillation, solvent extraction, fractional crystallization, etc. Advantageously any unreacted phosphorus reactant and the metal halide by-product may be washed out, and the residual solution of product may then be fractionally distilled.

Conversion of the dihydrocarbon-4-hydroxybutylphosphines to the corresponding phosphine oxides or sulfides is conducted by treating the phosphines with an oxidizing agent for preparation of the oxides or with sulfur or a sulfur acid halide, e.g., sulfuryl or thionyl chloride or bromide for preparation of the sulfides. Useful oxidizing agents are oxygen-containing gases, e.g., air, oxygen or ozone, peroxidic compounds such as hydrogen peroxide, sodium perborate, peracetic acid or perbenzoic acid, etc. Reaction of the phosphine with the oxidizing agent or with the sulfur reactant is generally conducted by mixing the two reactants at ordinary or increased temperatures, say at temperatures of from 10° C. to refluxing, and in the presence or absence of an inert solvent or diluent, e.g. one of the polar solvents disclosed above. Oxidations effected with a peroxidic agent are generally exothermic and external heating need not be applied except for the purpose of assuring completion of the reaction. Generally, also, external heating is not required for preparing the phosphine sulfides, particularly when the sulfur reactant is thionyl chloride or sulfuryl chloride. However, as in the case of the oxidizing reaction, temperatures of from room temperature to refluxing may be used.

The presently provided dihydrocarbon-4-hydroxybutyl phosphines or phosphine oxides are stable, well-defined compounds which range from high-boiling viscous liquids to waxy or crystalline solids. They are advantageously employed for a variety of commercial and industrial purposes, e.g., as extreme pressure resisting and stabilizing additives to lubricants of the hydrocarbon, polyester or polyphenyl ether types, as pre-ignition additives for leaded gasolines, as biological toxicants, and as stabilizers and plasticizers and flame-proofing agents for polymeric materials such as the vinyl halide polymers, the polyurethanes and cellulosic materials. Valuable plasticizers, lubricant additives or flame-proofing materials are obtained by reaction of the hydroxybutyl group of the phosphines or phosphine oxides with alkylene oxides such as ethylene oxide or propylene oxide to obtain polyglycol ethers, or with carboxylic acids, anhydrides or acyl halides to obtain esters.

The invention is further illustrated by, but not limited to, the following examples.

*Example 1*

Diphenylphosphinous chloride (22.05 g., 0.1 mole) was added to 2.43 g. (0.1 mole) of magnesium metal suspended in tetrahydrofuran, the quantity of the latter being in excess of the chloride and of the metal reactant in order to provide for dilution. After a few minutes there was a vigorous reaction, and a cold water bath was applied to control it. When reaction had subsided, heat was applied, and the mixture became green-brown in color. The whole was maintained overnight at 68° C., by the end of which time most of the magnesium metal had disappeared, and the color of the solution had deepened. After subsequent, overnight refluxing, the reaction mixture was allowed to cool to room temperature, mixed with water, and allowed to stratify. The organic layer was decanted, dried over anhydrous magnesium sulfate and distilled to remove the excess, unreacted tetrahydrofuran. Vacuum distillation of the residual yellow liquid gave 14.7 g. of the substantially pure diphenyl-4-hydroxybutylphosphine, B.P. 150–154° C./0.05 mm., $n_D^{25}$ 1.6100. Infra-red analysis showed phenyl-P absorption at 1440 cm.$^{-1}$ and OH absorption at 3200 cm.$^{-1}$.

*Example 2*

The diphenyl-4-hydroxybutylphosphine of Example 1 was oxidized to the corresponding phosphine oxide as follows:

To 3.63 g. (0.014 mole) of the phosphine dissolved in acetone there was gradually added an acetone solution of 30% aqueous hydrogen peroxide. The temperature rose to 65° C. More peroxide was added whenever the temperature began to drop until no further temperature rise was obtained. Concentration of the resulting solution on the steam bath and distillation of the thick oily, almost gummy residue gave the substantially pure diphenyl-4-hydroxybutylphosphine oxide, B.P. 164° C./0.01–0.02 mm./$n_D^{25}$ 1.5959, and analyzing as follows:

| Percent | Found | Calc'd for $C_{16}H_{29}PO_2$ |
|---|---|---|
| C | 70.72 | 70.01 |
| H | 6.58 | 6.90 |
| P | 10.53 | 11.30 |

*Example 3*

A solution of 37 g. (0.158 mole) of diphenylphosphinic chloride in an excess of tetrahydrofuran was added dropwise with stirring into a mixture of 3.45 g. (0.158 mole) of magnesium metal and 50 ml. of tetrahydrofuran in a nitrogen atmosphere. The temperature rose exothermally to 68° C. and the solution first turned milky white and then yellow. After all of the chloride had been added, the whole was refluxed for two hours. The resulting dark red reaction mixture was allowed to cool and then treated with water, which resulted in precipitation of a solid. This was dissolved by addition of dilute aqueous hydrochloric acid. The two layers which formed were separated and the organic phase was dried over magnesium sulfate. Removal from the dried material of the excess tetrahydrofuran which had served as solvent, and distillation of the residual viscous syrup gave 5.56 g. of a fraction, B.P. 138° C.–148° C./0.01 mm. Redistillation gave the substantially pure diphenyl-4-hydroxybutylphosphine oxide which was identical with the product obtained in Example 2.

I claim:

1. The method of preparing organophosphorus compounds which comprises contacting a phosphorus-halogen compound of the formula

wherein R is hydrocarbon which is free of olefinic and acetylenic unsaturation and contains from 1 to 12 carbon atoms, Y is a chalcogen element having an atomic weight of less than 33, $n$ is zero or 1 and X is halogen, with tetrahydrofuran and an active metal selected from the class consisting of alkali and alkaline earth metals, zinc, tin, iron and aluminum.

2. The method of preparing organophosphorus compounds which comprises contacting a phosphorus-halogen compound of the formula $R_2PX$ wherein R is hydrocarbon which is free of olefinic and acetylenic unsaturation and contains from 1 to 12 carbon atoms, and X is halogen, with tetrahydrofuran and an alkaline earth metal.

3. The method of preparing organophosphorus compounds which comprises contacting a phosphorus-halogen compound of the formula

wherein R is hydrocarbon which is free of olefinic and acetylenic unsaturation and contains from 1 to 12 carbon atoms, and X is halogen, with tetrahydrofuran and an alkaline earth metal.

4. The method of preparing diphenyl-4-hydroxybutylphosphine which comprises contacting a diphenylphosphinous halide with tetrahydrofuran and an alkaline earth metal.

5. The method of preparing diphenyl-4-hydroxybutylphosphine oxide which comprises contacting a diphenylphosphinic halide with tetrahydrofuran and an alkaline earth metal.

6. The method of preparing diphenyl-4-hydroxybutylphosphine which comprises contacting diphenylphosphinous chloride with tetrahydrofuran and magnesium.

7. The method of preparing diphenyl-4-hydroxybutylphosphine oxide which comprises contacting diphenylphosphinic chloride with tetrahydrofuran and magnesium.

References Cited by the Examiner

UNITED STATES PATENTS 2,957,931  10/1960  Hamilton et al. ____ 260—606.5
3,055,861   9/1962  Hersh et al. _____ 260—606.5

OTHER REFERENCES

Aksnes: "Acta Chem. Scand," 15, 438–440 (Feb. 1961).
Grayson: "Chem. and Eng. News," 40, 90–100 (Dec. 3, 1962).
Issleib et al.: Chemische Berichte, vol. 94, 1961, pages 102 to 106.
Kosolapoff: "Organo-Phosphorus Compounds," John Wiley & Sons, New York, N.Y. (1950), pp. 98–99.
Miller et al.: "J. Am. Chem. Sec.," 79, 424–427 (1957).
Trippett: "J. Chem. Sec." (July 1961), pp. 2813–2816.

TOBIAS E. LEVOW, *Primary Examiner*.

IRVING MARCUS, *Examiner*.

F. M. SIKORA, F. R. OWENS, W. F. BELLAMY,
*Assistant Examiners*.